(12) United States Patent
Hwang et al.

(10) Patent No.: US 9,168,422 B2
(45) Date of Patent: Oct. 27, 2015

(54) DIMPLE ARRANGEMENT ON THE SURFACE OF A GOLF BALL AND THE GOLF BALL THEREOF

(75) Inventors: In Hong Hwang, Namyangju-si (KR); Kyung Ahn Moon, Seoul (KR)

(73) Assignee: VOLVIK INC., Eumseong-gun, Chungcheongbuk-do (KR)

( * ) Notice: Subject to any disclaimer, the term of this patent is extended or adjusted under 35 U.S.C. 154(b) by 148 days.

(21) Appl. No.: 13/564,116

(22) Filed: Aug. 1, 2012

(65) Prior Publication Data

US 2013/0288827 A1  Oct. 31, 2013

(30) Foreign Application Priority Data

Apr. 26, 2012 (KR) .................. 10-2012-0043565

(51) Int. Cl.
    *A63B 37/12* (2006.01)
    *A63B 37/14* (2006.01)
    *A63B 37/00* (2006.01)
    *A63B 45/00* (2006.01)
    *B29L 31/54* (2006.01)

(52) U.S. Cl.
CPC .......... *A63B 37/0006* (2013.01); *A63B 37/0003* (2013.01); *A63B 45/00* (2013.01); *A63B 37/002* (2013.01); *A63B 37/0017* (2013.01); *A63B 37/0019* (2013.01); *B29L 2031/54* (2013.01)

(58) Field of Classification Search
CPC ............ A63B 37/0006; B29L 2031/54; B29C 2045/0034
USPC ................................................ 473/378–384
See application file for complete search history.

(56) References Cited

U.S. PATENT DOCUMENTS

| | | | |
|---|---|---|---|
| 5,078,402 A * | 1/1992 | Oka | 473/380 |
| 5,192,078 A * | 3/1993 | Woo | 473/379 |
| 5,564,708 A * | 10/1996 | Hwang | 473/382 |
| 5,575,477 A * | 11/1996 | Hwang | 473/379 |
| 5,688,193 A * | 11/1997 | Kasasima et al. | 473/379 |
| 5,824,258 A * | 10/1998 | Yamaguchi | 264/328.1 |
| 5,957,787 A * | 9/1999 | Hwang | 473/379 |
| 6,450,902 B1 * | 9/2002 | Hwang | 473/383 |
| 7,431,670 B2 * | 10/2008 | Nardacci et al. | 473/383 |
| 8,083,977 B2 * | 12/2011 | Nakagawa et al. | 264/161 |
| 2001/0027141 A1 * | 10/2001 | Sajima | 473/378 |
| 2004/0152541 A1 * | 8/2004 | Sajima | 473/378 |
| 2004/0251576 A1 * | 12/2004 | Endo et al. | 264/259 |
| 2006/0264271 A1 * | 11/2006 | Veilleux et al. | 473/378 |
| 2010/0197428 A1 * | 8/2010 | Aoyama et al. | A63B 37/0004 473/379 |
| 2012/0157238 A1 * | 6/2012 | Stefan | 473/378 |

FOREIGN PATENT DOCUMENTS

KR    10-1995-0023426    8/1995
KR    10-0182100 B1    12/1998

(Continued)

*Primary Examiner* — John E Simms, Jr.
(74) *Attorney, Agent, or Firm* — Paratus Law Group, PLLC (57) ABSTRACT

Disclosed are manufacturing of a golf ball. A golf ball has a plurality of circular dimples in its spherical outer surface, dividing into the faces of a spherical polyhedron by a plurality of division lines, wherein border lines are formed at the position of ±1~2 latitudinal degrees to the division lines, the circular dimples are arranged by using the border lines as an occupation limit line of the circular dimples positioned opposite to the division lines, and the golf ball has no dimple on the pole in the center of the spherical polyhedron is provided, thereby increasing the performance such as a carry distance by raising the proper amount of area ratio of dimples, obtaining the uniformity thickness cover molding without the inferior product due to the balanced gates with uniform size.

1 Claim, 10 Drawing Sheets

(56) References Cited

FOREIGN PATENT DOCUMENTS

| KR | 10-2000-0007178 | | 2/2000 |
|---|---|---|---|
| KR | 10-2001-0097085 | A | 11/2001 |
| KR | 10-2002-0070259 | A | 9/2002 |
| KR | 10-2006-0120897 | A | 11/2006 |
| KR | 10-2009-0089703 | A | 8/2009 |
| KR | 10-2012-0018068 | | 2/2012 |

* cited by examiner

DIMPLE ARRANGEMENT ON THE SURFACE OF A GOLF BALL AND THE GOLF BALL THEREOF

CROSS REFERENCE TO PRIOR APPLICATIONS

The present application claims priority to Korean Patent Application No. 10-2012-0043565 (filed on Apr. 26, 2012) under 35 U.S.C. §119, which is hereby incorporated by reference in its entirety.

BACKGROUND

The present invention relates to manufacturing of a golf ball, and more particularly, to the method of dimple arrangement capable of improving formability and performance of a golf ball simultaneously, and the golf ball thereof.

Generally, it is known that straightness, consistency, carry distance and so on, used as a measure of performance of a golf ball, are greatly affected by aerodynamic action depending on the size, depth, shape, arrangement of dimple formed on a surface of a golf ball.

Specifically, when a golfer hit a golf ball, strong repulsive elasticity is generated and launching the ball, at the same time back spin is generated by the loft angle of a golf club. For example, if the club is 10 degree driver, the impacted ball will fly away and also be formed the back spin of approximately 2200~4000 revolutions per minute at an initial state. At the moment, the dimples accelerate the transition of turbulent air flow around the boundary layer of a rotating ball surface in flight through the high speed air stream, in the meantime, the air pressure will increase beneath the reversed rotating ball whereas it decrease above the ball, as a result, aerodynamic lift equivalent to many times of gravity is generated due to the Bernoulli effect, that extends the carry distance of a golf ball.

Moreover, it lowers a coefficient of drag even at a low speed area by reducing the Critical Reynolds Number. But the speed and rotational strength of the ball does not maintain as initial state of hitting, they rapidly reduce from the peak of a ballistic trajectory to the landing point Which is called as a low speed area, accordingly the Critical Reynolds number will rapidly increase and a coefficient of drag as well.

Figure 1:
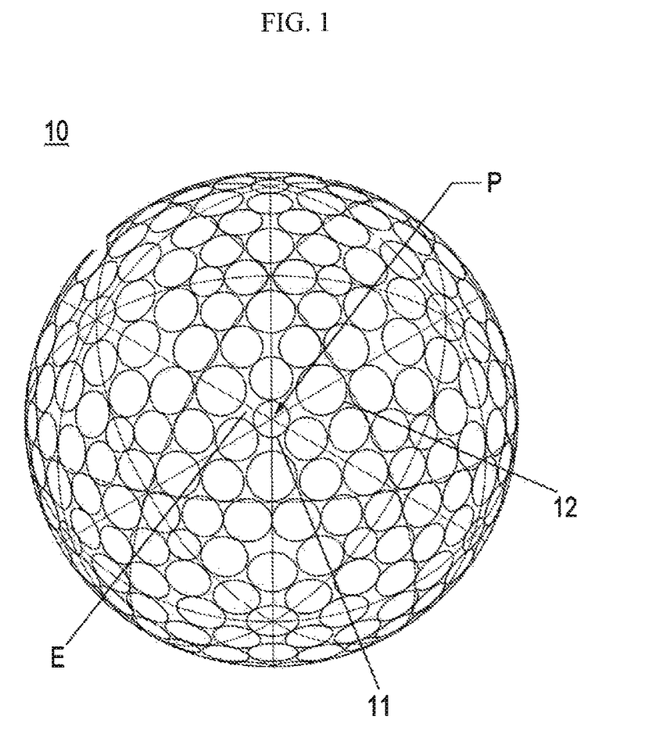
FIG. 1 and FIG. 2 are plan views illustrating the dimple arrangement of a conventional golf ball.
Figure 2:
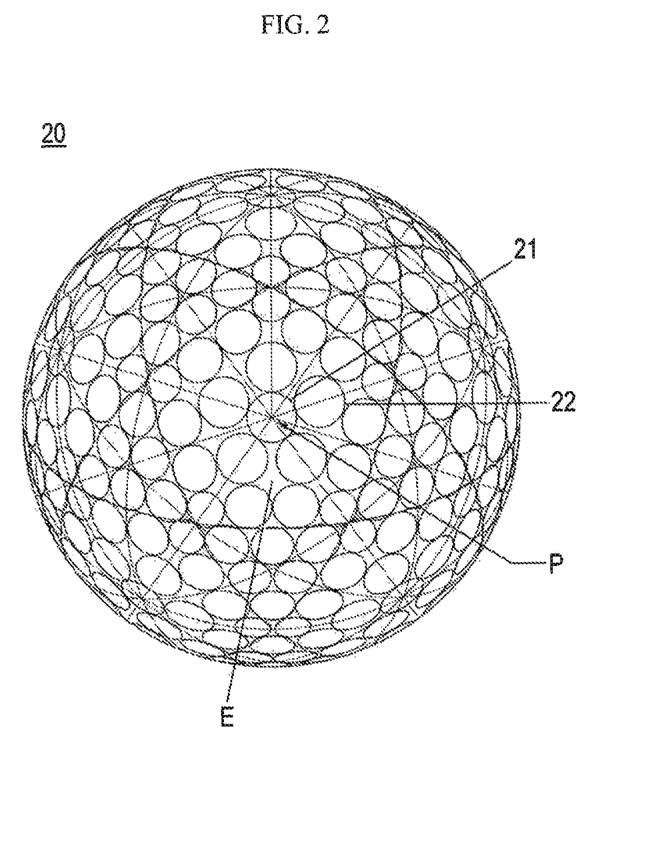

Meanwhile, the dimples being arranged by dividing the outer surface of a golf ball into the faces of a spherical polyhedron with the great circle paths that has a symmetry of left and right side of a golf ball. That spherical polyhedron is, for instance, spherical tetrahedron composed of 4 spherical triangles, spherical hexahedron composed of 6 spherical squares, spherical octahedron composed of 8 spherical triangles, spherical cube-octahedron composed of 6 spherical squares and 8 spherical triangles, spherical icosahedron composed of 20 spherical triangles, spherical icosi-dodecahedron composed of 20 spherical triangles and 12 spherical pentagons, and so on. There are many kinds of the dimple arrangement of the divisional composition of the surface of a golf ball into the faces of a spherical polyhedron by this manner. As a reference, FIG. 1 and FIG. 2 illustrate plane view of a golf ball that dimples being arranged on the spherical cube-octahedron and spherical icosi-dodecahedron respectively among the spherical polyhedron.

In this regard, recently the circular dimples are used a lot in general, the important matters of the dimple arrangements are volume ratio by it's depth of dimple and area ratio of dimples coverage on the surface of a golf ball. In case of volume ratio of dimples on the surface of a golf ball having circular dimples, which has a correlation with the area ratio of dimples on its surface due to the definite size of a ball, it is impossible to make cavities for cover mold allowing to freely change the volume of dimples by ignoring the area of dimples except the required volume ratio for obtaining fundamental aerodynamic lift, that due to the material and metal working for cover mold cavity which arranged the dimples directly. Therefore, if the area ratio of dimples corresponds to about 75%~84% of the total surface area of a golf ball having circular dimples, the total volume of dimples on its surface will be around 350 mm$^3$~490 mm$^3$. A volume ratio becomes proportional to the area ratio of dimples, that is, increasing the diameter of dimple results in a larger volume of dimple, and decreasing the diameter of dimple results in a smaller volume of dimple.

For convenience' sake, if a diameter of dimple is more than 0.15 inches (3.81 mm), that is called a large sized dimple, a diameter of dimple is smaller than 0.15 inches, called a small sized dimple. If hit a golf ball, large sized dimple lowers a coefficient of drag in a low speed area whereas it raise the coefficient of drag in a high speed area, on the contrary, small sized dimple lowers a coefficient of drag in a high speed area, but it tends to raise the coefficient of drag in a low speed area. But, the small sized dimple aid the aerodynamic stability. Drag which mentioned above is a combination of pressure drag and friction drag. The strength of pressure drag is affected by the shape, size of the substance and the stream direction, speed against it, whereas the strength of friction drag varies with the shearing strength caused by the viscosity of fluid flow the surface of the substance and the roughness of the surface of the substance. And a coefficient of drag varies with the Reynolds number, in case of a golf ball, there is no problem in terms of a carry distance and a stable flight at a high speed area from the hitting point to the apex of the ballistic trajectory, because a coefficient of drag diminish as the Reynolds number grows in that area. But the problems occurred in a low speed area from the apex of the ballistic trajectory to the landing point when decreasing the hitting power.

Meanwhile, recently it tends to make the dimple size have some similarities each other in a diameter by reason of an appearance of a golf ball, total number of dimples are get fewer 300~400, the composed size of dimple diameter get bigger than 0.15 inches inevitably, which the trajectory is seriously affected in accordance with the flow direction of the air. In addition, the carry distance is the first consideration in development of a golf ball which has an irrespective aerodynamic direction and the flight stability in dimple arrangement, which cause so many problems.

And, in order to raise the area ratio of dimples on the surface of a golf ball, or the reason of an appearance of it, the dimple arrangement is depart from the border and miss matched each other on the border of each polygon (for example, the spherical triangles and the spherical squares which composed of a spherical polyhedron in cube-octahedron) of the polyhedron, as a result of it, the mold parting line which the meeting line of the upper mold and bottom mold, that is not a straight line as the great circle paths which divide the surface of a golf ball into the faces of polyhedron, being a kind of meanderingly wave line with a regular continuity or discontinuity wave line. In addition, there is a type of zigzag line in actuality.

Figure 3:
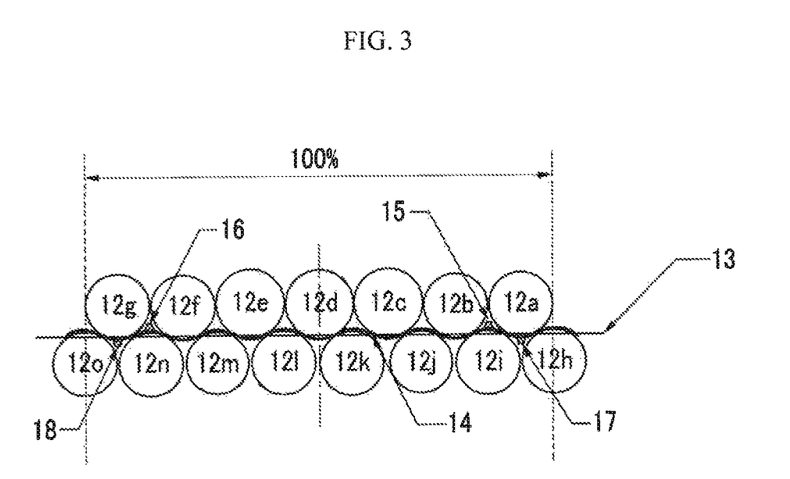
FIG. 3 and FIG. 4 are magnifying views illustrating the mold parting line on the equator region of a conventional golf ball.

Specifically, the manufacturing of mold becomes very difficult for making cover with an accurate symmetry between right and left side of the dimples of these golf balls. The difficulty of manufacturing mold, firstly, the matching of upper mold and bottom mold correctly which have same kind of a mold parting line with the meanderingly wave line, secondly, it is very difficult to make the gate size evenly and settle the gate position correctly for flowing the polymer materials uniformly which forming the cover of the golf ball. For example, as shown in FIG. 3, if dimples 12a~12o are arranged by the boundary of great circle 13 forming an equator of a golf ball, a wave mold parting line 14 is formed. And this wave type mold parting line 14 occupied 100% of the line composed the circumference of a circle as a straight line.

Therefore, it is difficult to form gates 15, 16, 17, 18 due to the narrow gap of dimples between upper and bottom side. And the size of the gates becomes so smaller that it is difficult to flow resin regularly. Also, the excessive pressure inflicted on the resin by an enforced passing through the smaller gate, that cause the phenomena of resin being decomposed, and the weld—lines by an unsealing molding of the polar region due to the clogged vent pin which exhaust the gas like materials, the burning phenomena which the resin being partially burned by the high pressure, and the cover filled with the gas. That is the seriously inferior phenomena, the cover has not a uniformly thickness and being an inferior appearance.

Meanwhile, if the molding by maintaining the holder pin for a long time for preventing an eccentricity of insert one which inserted in the cavity as a half finished goods, such as a core, dual core, the mantle covered the said core and inner cover until the resin get firmer, that achieved the inferior cover molding of a collapse, crack and something like this. By the inferior phenomena, a finished product having an undesirable appearance and which being split easily.

And, after treatment of the cover molding which made by using a mold in a hard way, for example, the removal of the gates and the remains of resins which flowing out from the edge of the mold parting line, the buffing (the treatment by using a cutter, sand paper and a sand stone) process for eliminating the interior part of molding near the vent pin and the polar region, a variation of the size of equator region, a difference between the size of equator to equator and pole to pole by an immoderate buffing due to the irregular parting line, or the dimple depth may be shallower and the polar region may be irregularity by that reason, which is changed the aerodynamic characteristics of the golf ball, and it has the unsettled landing point from the apex of the ballistic trajectory.

Figure 4:
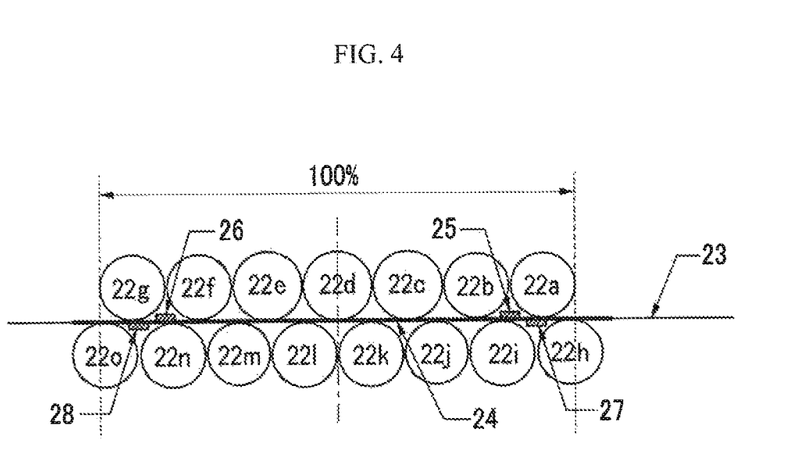

Meanwhile, a kind of golf ball, which has a dimple on the pole, and as shown in FIG. 4, the mold parting line 24 same as the straight line of the great circle path 23, that arranged the gates 25, 26, 27, 28 on the upper and bottom side of the mold parting line 24 in regularity, there is no problem for making the cavity mold, and in the after treatment process, the productivity is good for reducing the inferior phenomena of molding by the easy buffing process, but there is a limit for raising the area ratio of dimples of the surface of a golf ball basically.

SUMMARY OF THE INVENTION

Therefore, the present invention has been made in view of the above problems, it is an object of the present invention to provide a method of arranging dimples on the surface of a golf ball to obtain uniform and stable molding when forming the cover of the golf ball, and the golf ball which has an excellent flying trajectory without sacrificing carry distance and the characteristic of fixed landing point after flying.

In accordance with an aspect of the present invention, the above and other objects can be accomplished by the provision of a golf ball has a plurality of circular dimples in its spherical outer surface, dividing into the faces of a spherical polyhedron by a plurality of division lines, wherein border lines are formed at the position of ±1~2 latitudinal degrees to the division lines, the circular dimples are arranged by using the border lines as an occupation limit line of the circular dimples positioned opposite to the division lines, and the golf ball has no dimple on the pole in the center of the spherical polyhedron.

In embodiments, mold parting lines, formed by the circular dimples arranged in the equator region of the golf ball, comprise a straight mold parting line and a wave type mold parting line.

In embodiments, the length of the straight mold parting line is occupied 15%~35% of the line composed the circumference of a circle as a straight line, the length of the wave type mold parting line is occupied 65%~85% of the line composed the circumference of a circle as a straight line.

In embodiments, the golf ball is manufactured by using the upper mold and bottom mold which the gates formed on the upper and bottom side of the straight mold parting line.

In embodiments, the golf ball is manufactured by using one or more of the circular dimples which exist adjacent the polar region as vent pins.

In embodiments, the spherical polyhedron is any one of spherical tetrahedron composed of 4 spherical triangles, spherical hexahedron composed of 6 spherical squares, spherical octahedron composed of 8 spherical triangles, spherical cube-octahedron composed of 6 spherical squares and 8 spherical triangles, spherical icosahedron composed of 20 spherical triangles, spherical icosi-dodecahedron composed of 20 spherical triangles and 12 spherical pentagons.

In embodiments, the plurality of circular dimples arranged on the sphere's surface are identical in depth.

In embodiments, the plurality of circular dimples are arranged with various depths on the sphere's surface.

In embodiments, the plurality of circular dimples arranged on the sphere's surface are identical in diameter.

In embodiments, the plurality of circular dimples are arranged with various diameters on the sphere's surface.

In accordance with another aspect of the present invention, there is provided a method of arranging dimples on the surface of a golf ball, the method comprising (a) dividing the spherical outer surface of the golf ball into the faces of a spherical polyhedron by using division lines which have identical center with the golf ball's, (b) forming the border lines at the position of ±1~2 latitudinal degrees to the division lines in parallel, and (c) arranging the circular dimples on the rest region of the spherical polyhedron except the pole by using the border lines as an occupation limit line of the circular dimples positioned opposite to the division lines.

In embodiments, the circular dimples are arranged to have the mold parting lines mixed with a straight mold parting line and a wave type mold parting line in the equator region of the golf ball in the above process (c).

In embodiments, the circular dimples are arranged in order that the length of the straight mold parting line is occupied 15%~35% of the line composed the circumference of a circle as a straight line and the length of the wave type mold parting line is occupied 65%~85% of the line composed the circumference of a circle as a straight line.

The dimple arrangement as mentioned above composition that provides the golf ball aids a carry distance by raising the proper amount of area ratio of dimples, obtaining the uniformity thickness cover molding without the inferior product due to the balanced gates with uniform size.

The golf ball having an aerodynamic stability by this invention method, so the landing point is stable and excellent.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Now, preferred embodiments of the present invention will be described in detail with reference to the annexed drawings so that those skilled in the art will easily be able to implement the present invention. Although the preferred embodiments of the present invention have been disclosed for illustrative purposes, those skilled in the art will appreciate that various modifications, additions and substitutions are possible. Further, in the drawings, elements which are not related to the description of the present invention will be omitted when it may make the subject matter of the present invention rather unclear, and some parts which are similar throughout the description are denoted by similar reference numerals even though they are depicted in different drawings.

Figure 5:
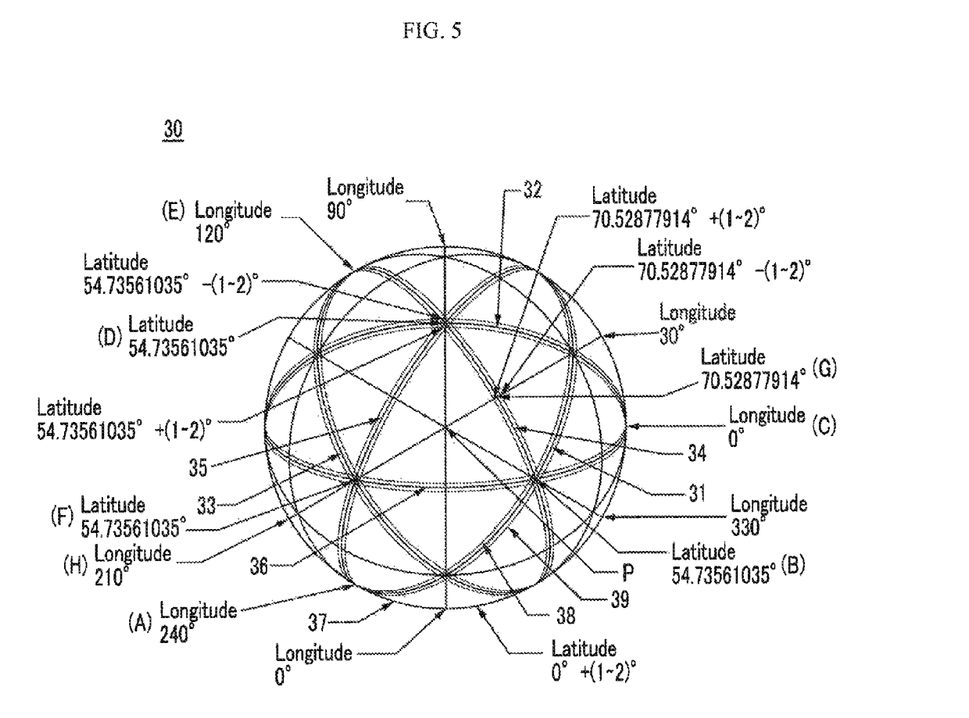
FIG. 5 is a plan view illustrating the surface of a golf ball divided into the faces according to an embodiment of the present invention.
Figure 6:
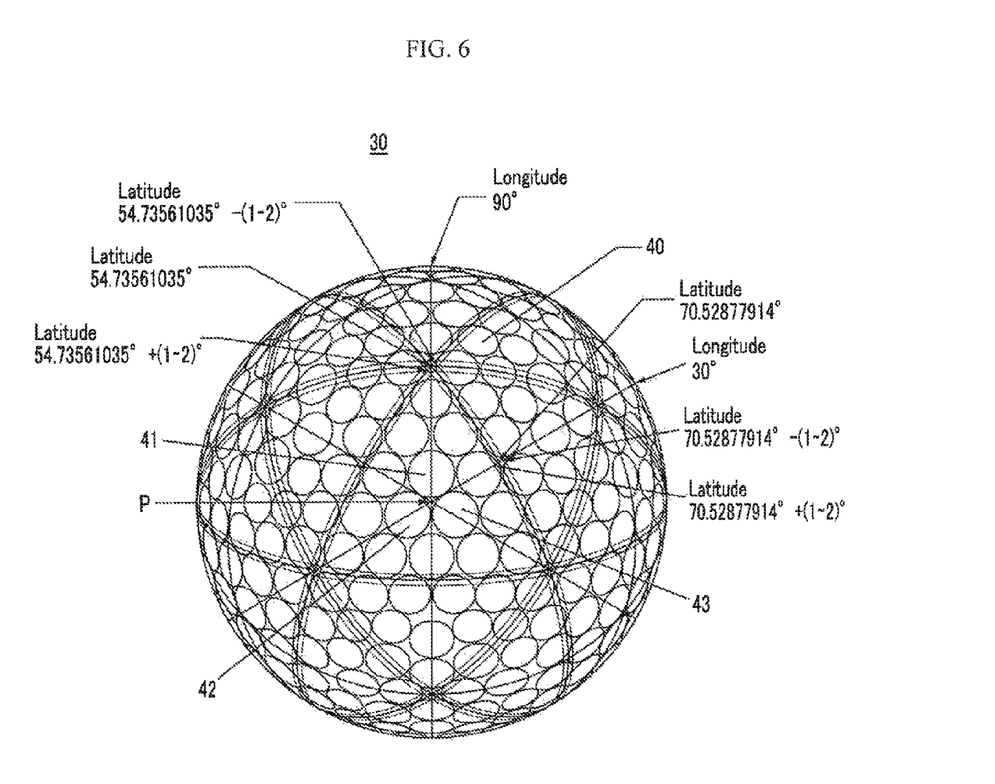
FIG. 6 is a plan view illustrating the dimple arrangement of a golf ball according to an embodiment of the present invention.

FIG. 5 is a plan view illustrating the surface of a golf ball divided into the faces according to an embodiment of the present invention, and FIG. 6 is a plan view illustrating the dimple arrangement of a golf ball according to an embodiment of the present invention.

Referring to FIG. 5 and FIG. 6, the surface of a golf ball 30 according to the embodiment of the present invention is divided into the faces of a spherical cube-octahedron (spherical octahedron) by using the great circle paths.

Specifically, the great circle paths include the first great circle path 31 passing through the point A (longitude 240 degree, latitude 0 degree) and the point B (longitude 330 degree, latitude 54.73561035 degree), the second great circle path 32 passing through the point C (longitude 0 degree, latitude 0 degree) and the point D (longitude 90 degree, latitude 54.73561035 degree), the third great circle path 33 passing through the point E (longitude 120 degree, latitude 0 degree) and the point F (longitude 210 degree, latitude 54.73561035 degree), the firth great circle path 34 passing through the point D (longitude 90 degree, latitude 54.73561035 degree) and the point G (longitude 30 degree, latitude 70.52877914 degree), the fifth great circle path 35 passing through the point D (longitude 90 degree, latitude 54.73561035 degree) and the point F (longitude 210 degree, latitude 54.73561035 degree), the sixth great circle path 36 passing through the point F (longitude 210 degree, latitude 54.73561035 degree) and the point B (longitude 330 degree, latitude 54.73561035 degree), and seventh great circle path 37 passing through the point C (longitude 0 degree, latitude 0 degree) and the point H (longitude 210 degree, latitude 0 degree).

Herein, one of the remarkable features of the present invention is that circular dimples 40 are arranged by using the border lines 38, 39 to the great circle paths 31, 32, 33, 34, 35, 36, 37 by a distance of 1~2 latitudinal degrees, that is, parallel to the both sides of the said great circle paths 31, 32, 33, 34, 35, 36, 37. This remarkable feature of the present invention will be described later in detail. For reference, in FIG. 5 and FIG. 6, though the reference numerals 38, 39 are denoted at the border line of the first great circle path 31 only for convenience, but the border lines of the rest great circle paths 32, 33, 34, 35, 36, 37 are formed in the same manner as described above.

After the surface of the golf ball 30 is divided into the faces of a spherical polyhedron as described above, the circular dimples 40 are arranged. In the present invention, the golf ball 30 has no circular dimple 40 on the pole P in the center of the spherical polyhedron, that is another remarkable feature. But in the case of the conventional dimple arrangement as shown in FIG. 1 and FIG. 2, if circular dimples 11, 21 are arranged on the pole P, the area of edge E, that is, a space between a dimple to dimple is broadened around the circular dimples 12, 22 near the circular dimples 11, 21 of the pole P. This unnecessary area gives the minus effect to the aerodynamic lift of a golf ball, particularly, if a dimple which the diameter is smaller than 0.1 inch is arranged on the pole P, the dimple has no effect on it. Furthermore, the smaller pole dimple which using a vent pin makes a disadvantage to exhaust the gas materials in the molding process due to the too small size.

Therefore, in the present invention, unnecessary area which impedes the performance of the golf ball 30 is minimized by arranging no dimple on the pole P, and performance and formability are improved simultaneously by using one, two, or all of the dimples 41, 42, 43 which exist near the pole P as vent pins.

A method of arranging dimples on the surface of a golf ball according to an embodiment of the present invention has been described as above. Hereinafter, a method of arranging dimples on the surface of a golf ball according to other embodiment of the present invention will be described in detail with reference to the drawings.

Figure 7:
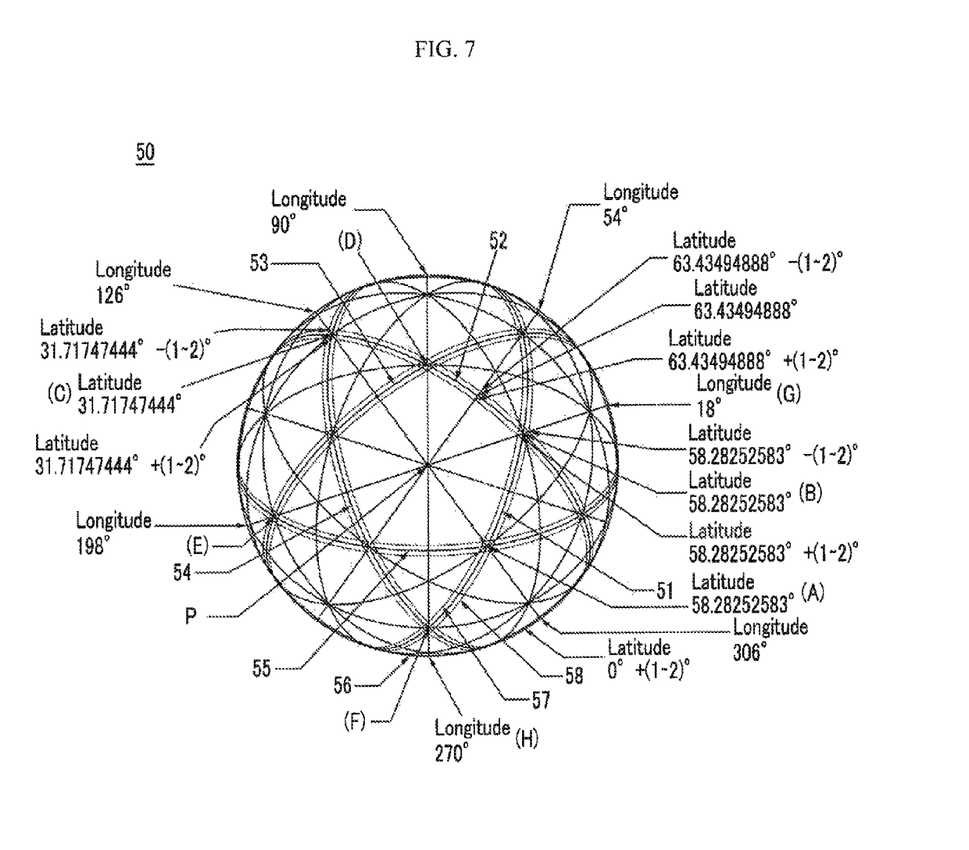
FIG. 7 is a plan view illustrating the surface of a golf ball divided into the faces according to other embodiment of the present invention.
Figure 8:
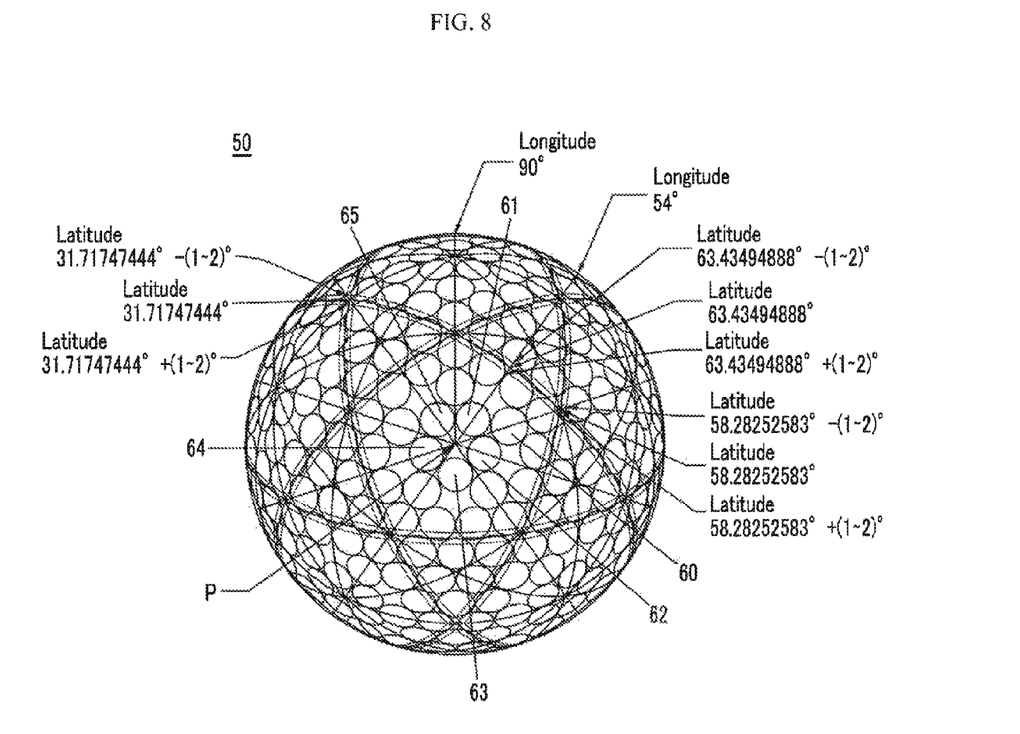
FIG. 8 is a plan view illustrating the dimple arrangement of a golf ball according to other embodiment of the present invention.

FIG. 7 is a plan view illustrating the surface of a golf ball divided into the faces according to other embodiment of the present invention, and FIG. 8 is a plan view illustrating the dimple arrangement of a golf ball according to other embodiment of the present invention.

As shown in FIG. 7 and FIG. 8, the surface of a golf ball 50 according to other embodiment of the present invention is divided into the faces of a spherical icosi-dodecahedron (icosahedrons) by using the division lines, specifically, the first great circle path 51 passing through the point A (longitude 306 degree, latitude 58.28252583 degree) and the point B (longitude 18 degree, latitude 58.28252583 degree), the second great circle path 52 passing through the point B (longitude 18 degree, latitude 58.28252583 degree) and the point C (longitude 126 degree, latitude 31.71747444 degree), the third great circle path 53 passing through the point D (longitude 90 degree, latitude 58.28252583 degree) and the point E (longitude 198 degree, latitude 31.71747444 degree), the forth great circle path 54 passing through the point C (longitude 126 degree, latitude 31.71747444 degree) and the point F (longitude 270 degree, latitude 31.71747444 degree), the fifth great circle path 55 passing through the point E (longitude 198 degree, latitude 31.71747444 degree) and the point A (longitude 306 degree, latitude 58.28252583 degree), and the sixth great circle path 66 passing through the point Cr (longitude 18 degree, latitude 0 degree) and the point H (longitude 270 degree, latitude 0 degree).

In this case, circular dimples 60 are arranged by using the border lines 57, 58 to the great circle paths 51, 52, 53, 54, 55, 56 by a distance of 1~2 latitudinal degrees, that is, parallel to the said great circle paths 51, 52, 53, 54, 55, 56 as described above. For reference, in FIG. 7 and FIG. 8, the reference numerals 57, 58 are denoted at the border line of the first great circle path 51 only for convenience.

The circular dimples 60 are arranged on the rest region of the golf ball except the pole P to raise the area ratio of dimples by minimizing edge area. Herein, one, two, or three of dimples 61, 62, 63, 64, 65 which exist near the pole P are able to be used as vent pins.

Figure 9:
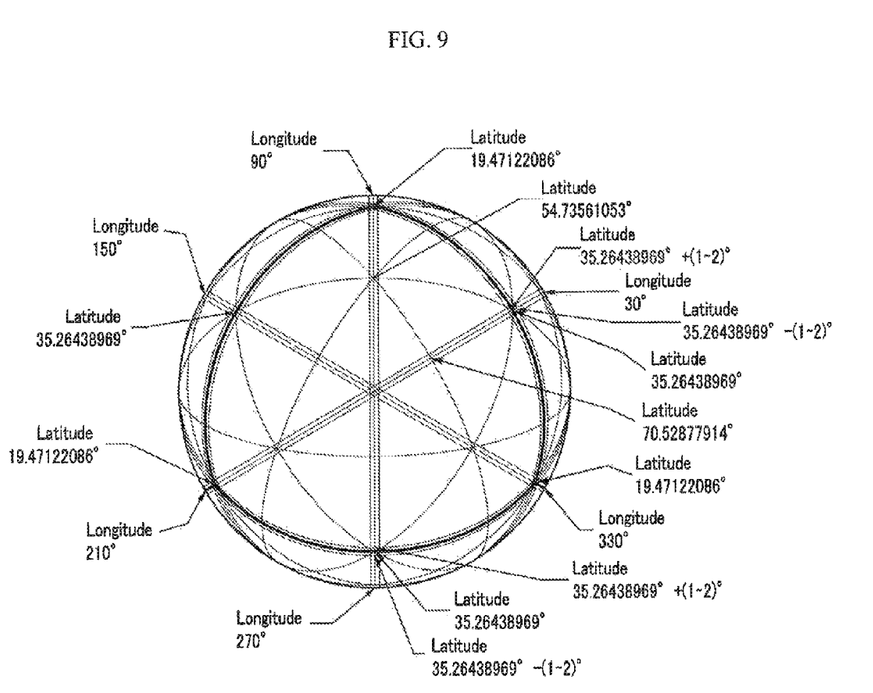
FIG. 9 and FIG. 10 are plan views illustrating the surface of a golf ball divided into the faces according to another embodiment of the present invention.
Figure 10:
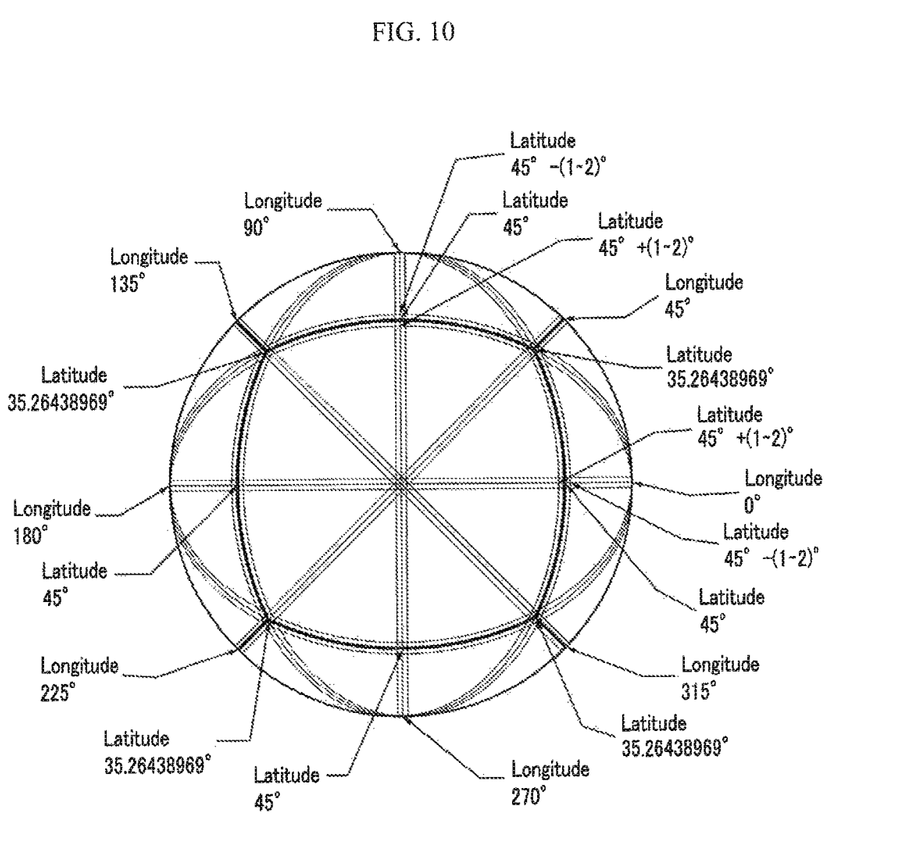

A method of arranging dimples on the surface of a golf ball according to other embodiment of the present invention has been described as above. In this regard, herein only a spherical cube-octahedron (spherical octahedron) and a icosi-dodecahedron (icosahedrons) are described as a spherical polyhedron dividing the surface of a golf ball. But the spherical polyhedron of the present invention is not limited to the spherical cube-octahedron (spherical octahedron) and the icosi-dodecahedron (icosahedrons), so it is possible to be a spherical tetrahedron composed of 4 spherical triangles as shown in FIG. 9 or a spherical hexahedron composed of 6 spherical squares as shown in FIG. 10.

Hereinafter, a method of arranging dimples on the surface of a golf ball according to the present invention will be described in more detail with reference to the drawing.

Figure 11:
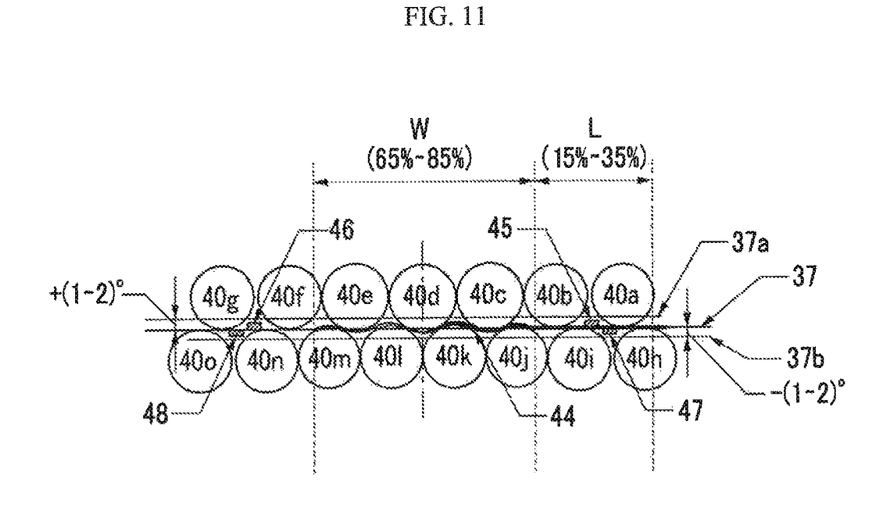
FIG. 11 is a magnifying view illustrating the mold parting line on the equator region of a golf ball according to the present invention.

FIG. 11 is a magnifying view illustrating the mold parting line on the equator region of a golf ball according to the present invention.

Referring to FIG. 11, in the present invention the circular dimples 40 are arranged by using the border lines 38, 39 to the great circle paths 31, 32, 33, 34, 35, 36, 37 by a distance of 1~2 latitudinal degrees as described above. Herein, if the separation distance of the border lines 38, 39 is smaller than 1 latitudinal degree, the desirable area ratio of dimples cannot achieved by straying out too small part from the equator, the one of the great circle paths 31, 32, 33, 34, 35, 36, 37, due to the large dimples over 0.15 inches in a diameter which using in the present dimple arrangement method. On the contrary, if the separation distance of the border lines 38, 39 is larger than 2 latitudinal degrees, straying out too large part from the equator, it gets an inaccurate symmetry between right and left side of the dimples of a golf ball by the irregular parting line, the golf ball may be inferior in appearance and performance due to the unbalance between the dimples of the mold parting line of the straight line and wave line which will be described later.

Specifically, as shown in FIG. 11 the border lines 37a, 37b are formed at the position departed from 1~2 latitudinal degrees to the line 37 of the great circle paths 31, 32, 33, 34, 35, 36, 37 in the equator region, and the upper and lower dimples 40a to 40o lay down between the border lines 37a, 37b, thus real mold parting line 44 of the present invention is formed by the said dimples 40a to 40o.

Herein., the dimples 40a to 40o are arranged to have the mold parting line 44 mixed with a straight mold parting line and a wave type mold parting line. Specifically, the mold parting line 44 has a shape that straight line (segment "L") which formed at between the upper dimples 40a, 40b and bottom dimples 40h, 40i, and wave type line (segment "W") which formed at between the upper dimples 40c, 40d, 40e and bottom dimples 40j, 40k, 40l, 40m are repeated continuously and periodically to the direction of the circumference of a circle. In this case, the length of the segment L is occupied 15%~35% of the line composed the circumference of a circle as a straight line 37, the length of the segment W is occupied 65%~85% of the line composed the circumference of a circle as a straight line 37. If the segment L is shorter than 15%, it is difficult to make the stable and regular gates, in case of the segment L is longer than 35%, it is difficult to increase the area ratio of dimples on the equator region, that is not suitable for this invention.

By forming the mold parting line 44 as described above, the gates 45, 46, 47, 48 are made stable and regularity without influence of the dimples 40a to 40o on the upper and bottom sides of the straight mold parting line, so the homogeneous injection molding obtained which has not any defects.

A golf ball manufactured according to the present invention as described above can minimize defects appearing in the production process by raising the area ratio of dimples properly, manufacturing the mold which has stable and uniform gates from having the proper length of wave type mold parting line and straight mold parting line together. And the gas like materials in a molding process can be easily exhausted effectively by the plural vent pins. As a result of this way, the molding product has no defects with a uniformity, a golf ball which has an excellent carry distance, and the characteristic of fixed landing point after flying, that obtained by the uniformed molding when forming the cover.

While this invention has been particularly shown and described with reference to preferred embodiments thereof, it will be understood by those skilled in the art that various changes in form and details may be made therein without departing from the spirit and scope of the invention as defined by the appended claims.

Therefore, the scope of the invention is defined not by the detailed description of the invention but by the appended claims, and all the modifications and variations derived from the meaning, scope, and equivalent concept of the appended claims will be construed as being included in the present invention.

The invention claimed is:

1. A method for manufacturing a golf ball, the method comprising:
   dividing a spherical outer surface of the golf ball into faces of a spherical polyhedron selected from spherical cube-octahedron composed of 6 spherical squares and 8 spherical triangles by using division lines which have an identical center with the golf ball's;
   forming border lines in parallel at a position of ±1~2 latitudinal degrees to the division lines; and
   arranging circular dimples on the rest region of the spherical polyhedron and no circular dimples on a pole of the golf ball by using the border lines as an occupation limit line of the circular dimples positioned opposite to the division lines,
   wherein the circular dimples are arranged to have mold parting lines mixed with a straight mold parting line and a wave type mold parting line in the equator region of the golf ball,
   wherein the length of the straight mold parting line occupies 15%~35% of the line composing the circumference of a circle as a straight line and the length of the wave type mold parting line occupies 65%~85% of the line composing the circumference of a circle as a straight line, wherein each instance of the wave type mold parting line is longer in length than a diameter of the circular dimple, wherein the golf ball is manufactured by using an upper mold and a bottom mold which have gates formed on upper and bottom sides of the straight mold parting line excepting the wave type mold parting line and by using one or more of the circular dimples positioned adjacent and nearest to the pole of the golf ball as vent pins.

* * * * *